April 21, 1970     G. R. JACOBS     3,507,739

PLATEN

Filed Dec. 5, 1966

INVENTOR.
GILBERT R. JACOBS
BY
Herbert Smith Sylvester
ATTORNEY

United States Patent Office 3,507,739
Patented Apr. 21, 1970

3,507,739
PLATEN
Gilbert R. Jacobs, Mine Hill, N.J., assignor to Ja-Bar Silicone Corporation, Denville, N.J., a corporation of New Jersey
Filed Dec. 5, 1966, Ser. No. 599,204
Int. Cl. B32b 3/10
U.S. Cl. 161—114                                                       4 Claims

ABSTRACT OF THE DISCLOSURE

An improved platen suitable for use at high temperatures, comprising an apertured, rigid, self-supporting, metal sheet and a heat-conductive elastomer which is stable at 400° F. bonded to the front surface of the sheet and to the surfaces forming the walls of the apertures, said elastomer forming the working surface of the platen.

---

Figure 1:
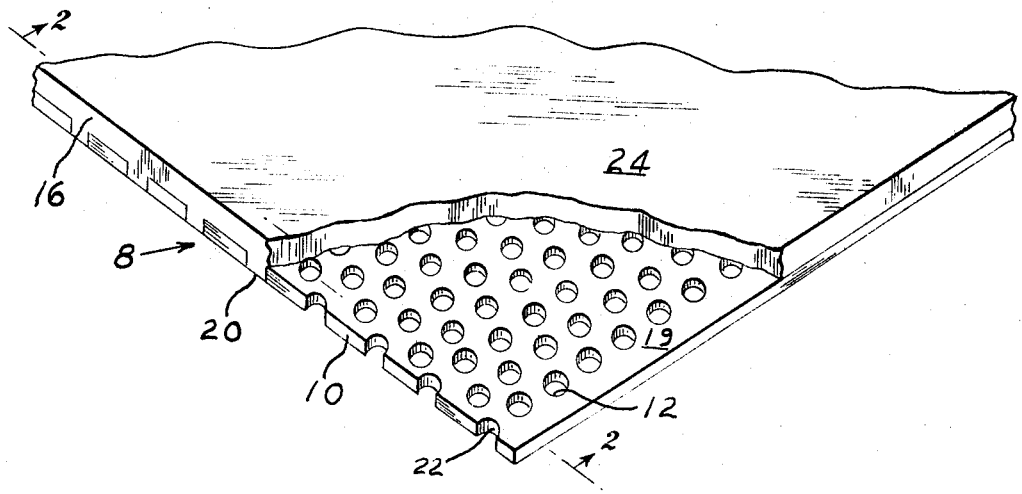

This invention relates to platens. More particularly it relates to platens of laminated construction, i.e., platens consisting of a base member to which is bonded an elastomeric lamina which forms the working surface of the platen.

In conventional platen construction an elastomeric material is bonded to a solid metal base using well-known adhesive-bonding techniques. This construction, while previously considered satisfactory for normal low temperature operations, has been characterized by rapid failure (through delamination) when such platens are employed at elevated temperatures such as are encountered in hot-stamping of pigment leaf and in heat sealing of thermoplastic materials. This problem of delamination is especially acute in those instances in which there is a relative rolling motion between the platen and the surface urged thereagainst because of the formation in the elastomer of pressure waves adjacent to the compressed areas thereof which tend to lift the elastomeric layer away from the base on which it is supported.

The present invention contemplates a novel platen construction having improved resistance to delamination and substantially longer life than previously available, especially when used at high temperatures on relatively moving surfaces. Platens of the instant construction are also characterized by improved useful production rates by virtue of their superior heat transfer characteristics.

The platen of the present invention will be illustrated in conjunction with the appended drawings which are illustrative of but not limitations on the present invention.

Figure 2:
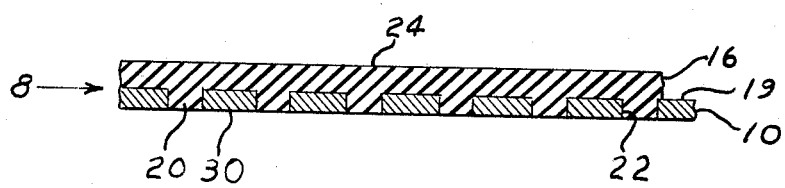

In the drawings:

FIG. 1 is a view, in perspective and partially broken away, of a laminated platen in accordance with the present invention; and FIG. 2 is a cross-sectional view in elevation of the platen fo FIG. 1, being taken along the line 2—2 thereof in the direction shown.

In the drawings, a platen 8 has a sheet metal steel base plate 10 which is perforated by a plurality of cylindrical apertures 12. The base plate 10 is self-supporting and substantially rigid, being about 0.0625 inch thick. The cylindrical apertures 12 have a diameter of approximately 0.125 inch, and are spaced uniformly on 0.1875-inch centers in a regular trigonal pattern.

An elastomeric lamina 16 of heat conductive and thermally stable silicone rubber is bonded by conventional bonding techniques to the front face 19 of the steel base plate 10. In addition, integral projections 20 depend from the elastomeric lamina 16 into the apertures 12 and are similarly bonded to the side walls 22 thereof. The exposed top working surface 24 of the elastomeric lamina is smooth and flat and may be used in the conventional manner.

The rear surface 30 of the steel base plate 10 is perforated and the perforations are filled with elastomeric material flush with the surface 30 of the base plate. However, as is particularly illustrated by FIG. 2, the rear surface 30 of the steel base plate 10 is uncoated, thereby facilitating efficient heat transfer to the steel base plate when the platen is attached to and held against a heated press for use.

Considering the more general aspects of the invention, the instant platen embodies a metal base which preferably is rigid and self-supporting and suitably is fabricated from steel, copper, aluminum, or like heat conductive material. The base is foraminous, and the exposed pressure face carried by the base is elastomeric, preferably being a polymeric elastomer which is heat conductive and stable at 400° F. The silicone rubbers and fluoro elastomers such as Kel-F (polymerized monochlorotrifluoroethylene) and Viton (copolymerized vinylidene fluoride and hexafluoropropylene) preferably are utilized by virtue of their resilience, stability at high temperatures and lack of undesirable cold flow properties.

Although the elastomer is employed in a manner in which heat is conducted through it, it is substantially less conductive than the metal base-plate to which it is bonded, and the conduction of heat from a heat source in the press in which the instant platen is used to the platen as a whole takes place primarily through the exposed uncoated rear surface of the metal base-plate.

The additional contact area derived from the instant apertures increases the heat transfer coefficient between the metal backplate and the elastomer. This in turn increases the production rate which may be realized on use of the instant platen as contrasted to the previously available unperforated platens since one of the drawbacks of the latter is the restriction placed on their production rates by resistance to heat transfer to (and through) the elastomer.

The apertures in the metal base of the platen of the instant invention serve to increase the total surface area of the metal to which the elastomeric lamina is bonded, thereby increasing the gross strength of the chemical bond therebetween, and also to provide a mechanical locking action which aids the elastomeric lamina in resisting delamination from the effects of the pressure waves which form in the elastomeric material adjacent to where it is compressed during use. In the case of cylindrical apertures, it is desirable that the depth of each cylindrical aperture be more than one-fourth its diameter, or expressed in another manner, that the diameter of each aperture be less than four times its depth, which preferably, but not necessarily, is the full thickness of the base in the case of a sheet metal base.

The relationship between the apertured area of the base-plate, the intact area of the base plate, and the thickness of the elastomeric lamina are interrelated in that it is desirable to minimize any possible stippling of the pressure face of the platen and to assure maintenance of relatively uniform heat transfer thereto. Thus, in general it has been found desirable that the base plate have at least about 80 percent of intact area remaining and that the thickness of the elastomeric layer above the front surface of the base be at least about .032 inch, and suitably on the order of from about .062 to about .250 inch.

The method by which the elastomeric lamina is bonded to the metal base is not critical, and well-known conventional methods may be used. Thus, for example, bonding may be accomplished by cleansing the metal to remove surface contaminates, priming the metal surface with an appropriate primer, e.g., a silicone primer, and applying the elastomer thereto, or a self-bonding compound which eliminates the necessity of priming the surface may be used.

It is to be understood that the invention herein illustrated and described is to be limited only by the scope of the claims appended hereto, and that various changes and equivalents may be substituted without departing from the true spirit of the invention.

What is claimed is:

1. An improved platen suitable for use at high temperatures comprising a rigid, self-supporting, metal sheet having front and rear surfaces, said sheet being perforated by a plurality of apertures which expose surfaces transverse to said sheet, the surface area of said exposed transverse surfaces being substantially greater than the surface area of the mouths of said apertures, and a heat-conductive, polymeric elastomer which is stable at 400° F., said polymeric elastomer being selected from the group consisting of silicone rubbers and fluoro elastomers, being bonded to the front surface of said sheet and to said exposed surfaces transverse to said sheet to form the working surface of the platen, the thickness of the elastomer layer above the front surface of said metal sheet being about 0.032 inch to about 0.25 inch so as to provide a non-stippled, elastomeric surface, said platen being characterized by superior heat transfer characteristics and resistance to delamination when used at high temperatures on relatively moving surfaces.

2. A platen as set forth in claim 1 in which said elastomer is a silicone rubber.

3. A platen as set forth in claim 2 in which the intact surface area of the front surface of said sheet is at least about 80% of the total area of the sheet.

4. A platen as set forth in claim 3 in which said sheet is about 0.0625 inch thick and said apertures are cylindrical in shape, each having a depth which is more than one-fourth of the aperture diameter which is about 0.125 inch.

References Cited

UNITED STATES PATENTS

| 1,206,346 | 11/1916 | McTernen | 161—114 |
| 2,003,494 | 6/1935 | Reynolds | 161—114 |
| 2,198,008 | 4/1940 | Iknayan | 161—114 |
| 3,277,823 | 10/1966 | Redding | 161—114 |

DOUGLAS J. DRUMMOND, Primary Examiner

U.S. Cl. X.R.

38—66; 100—295